Aug. 22, 1967  H. COANDA  3,337,121
FLUID PROPULSION SYSTEM
Filed July 22, 1964  8 Sheets-Sheet 2

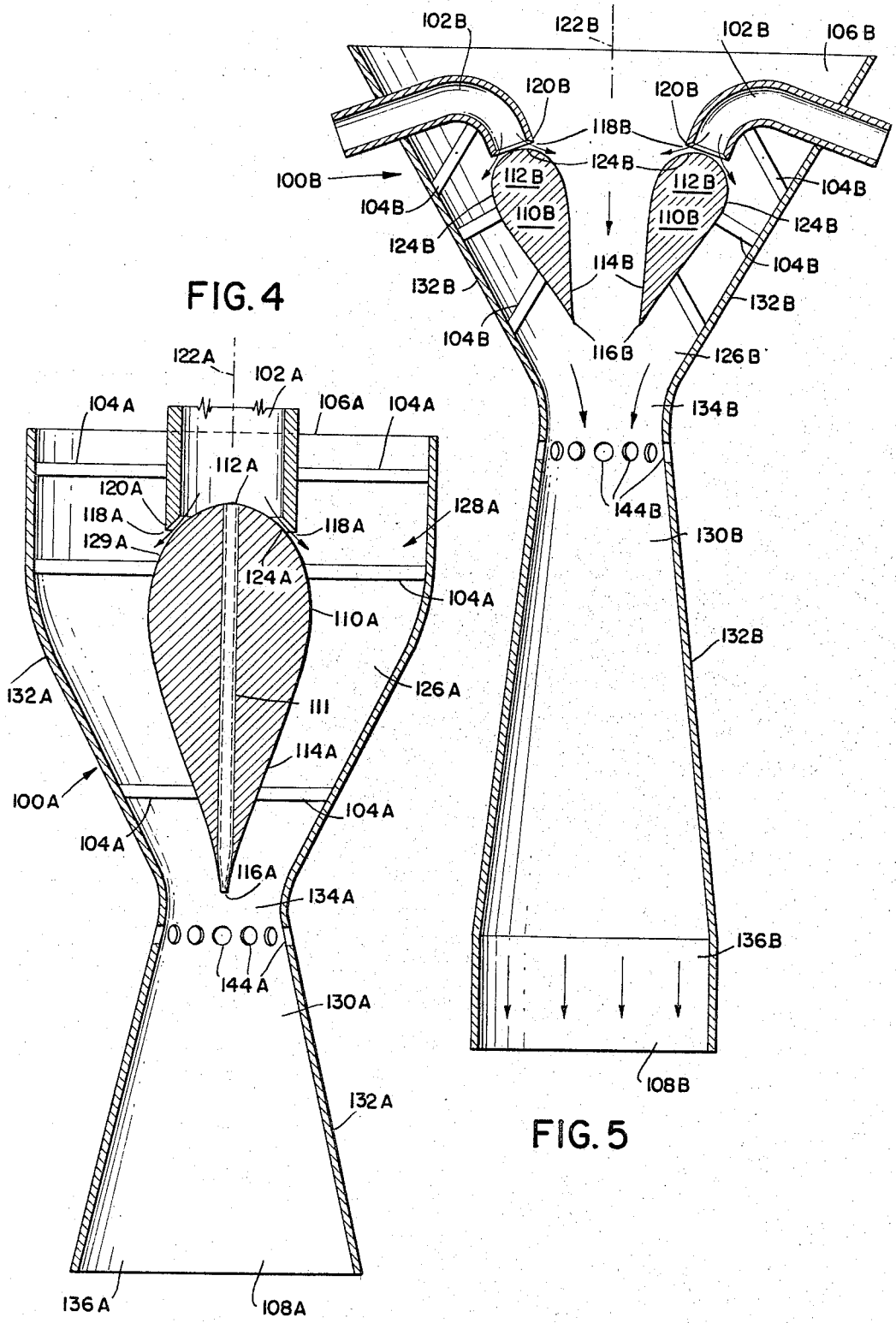

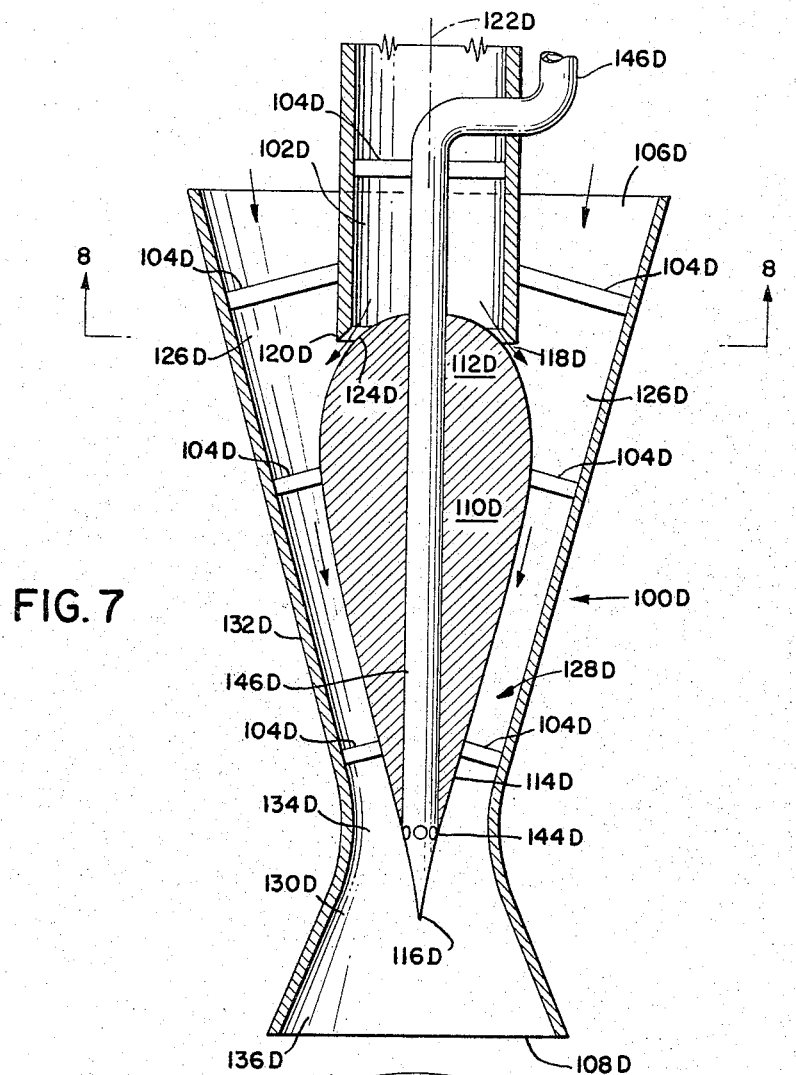
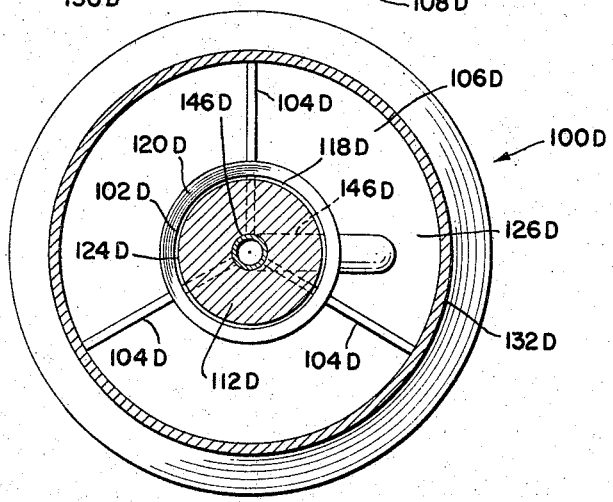

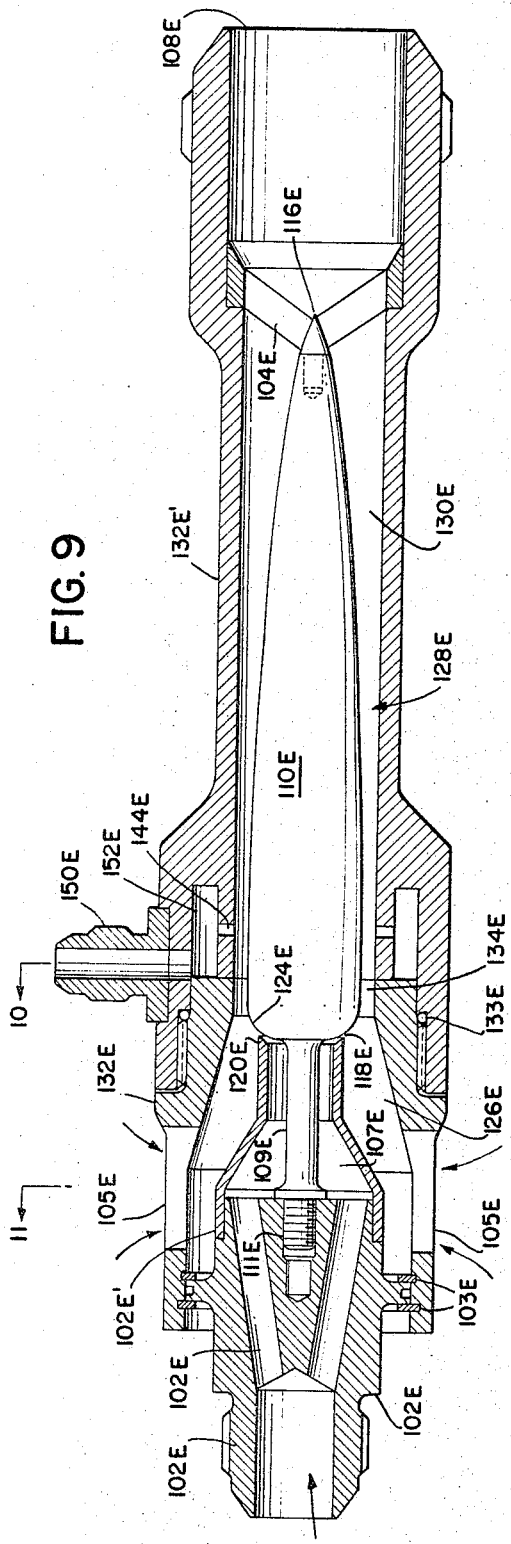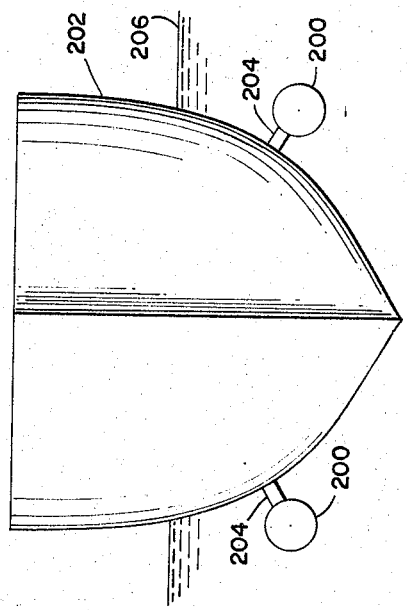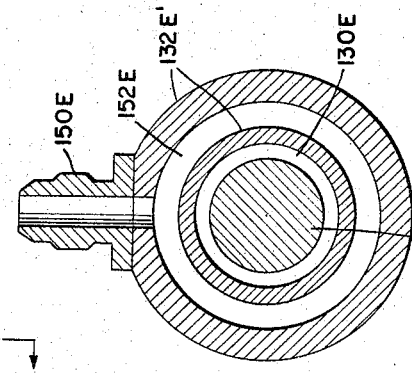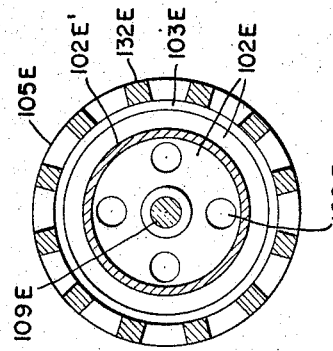

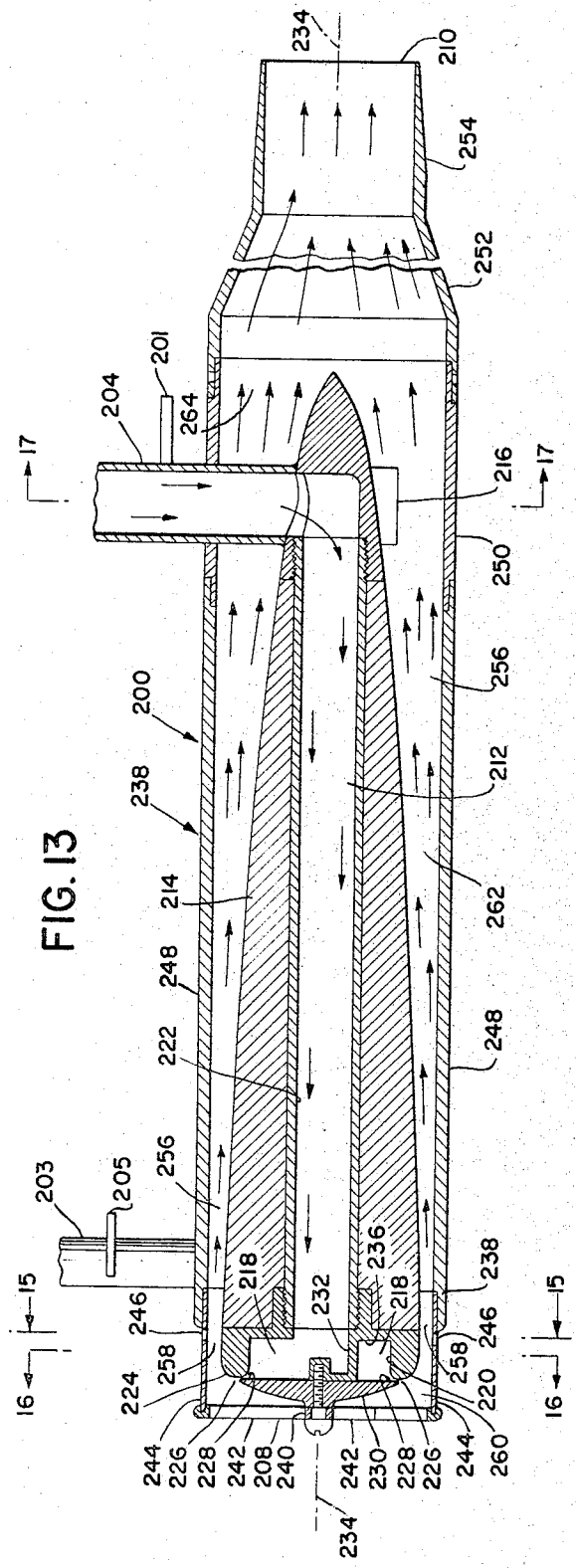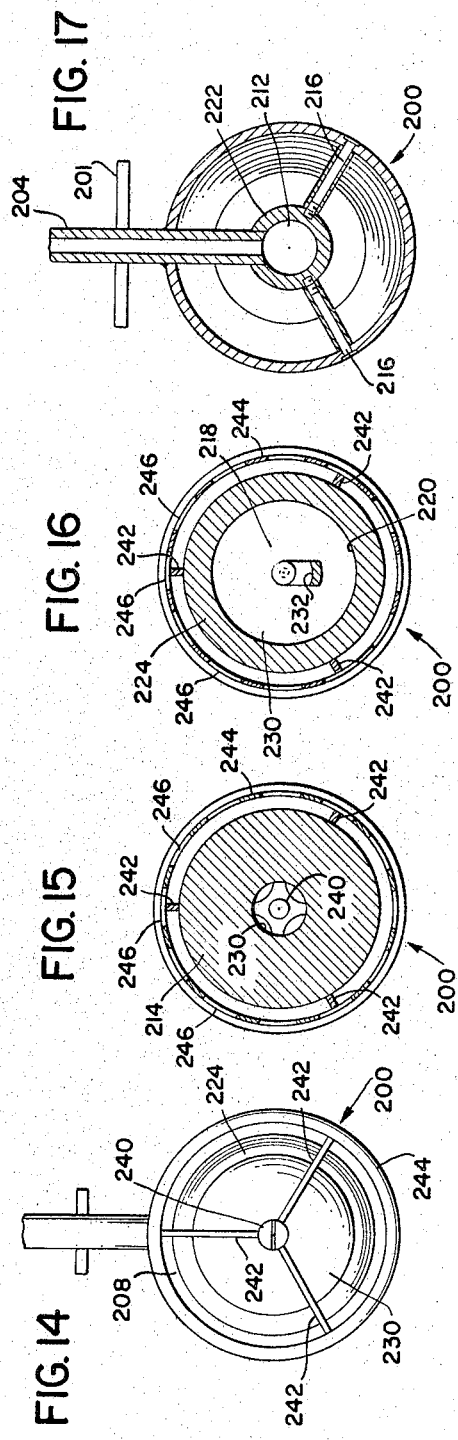

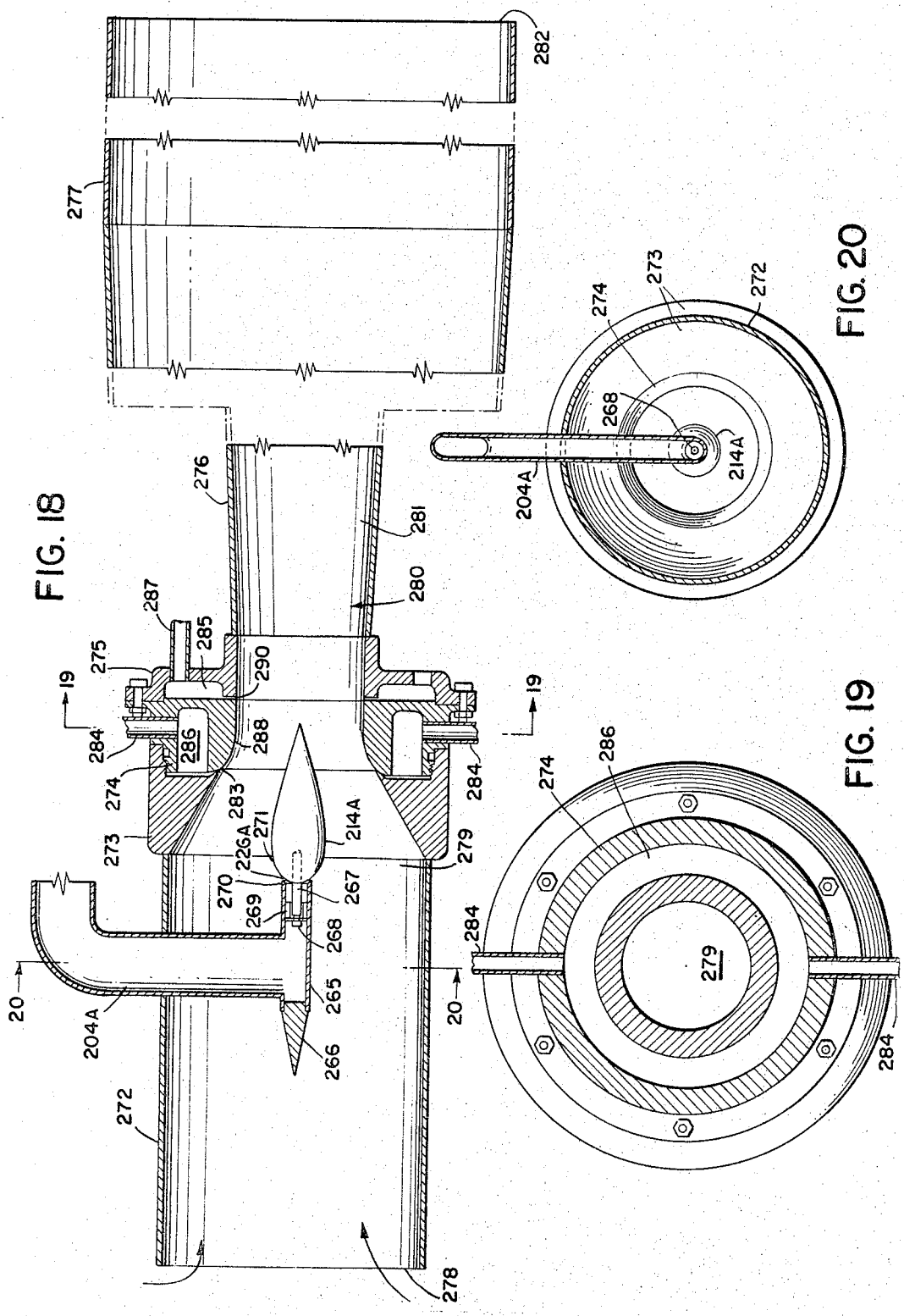

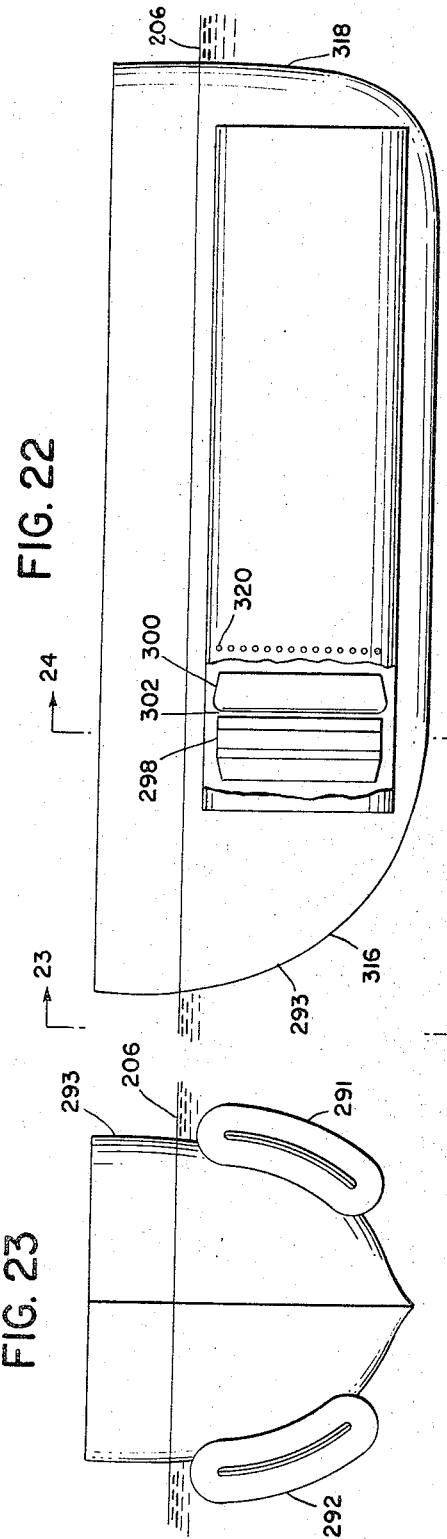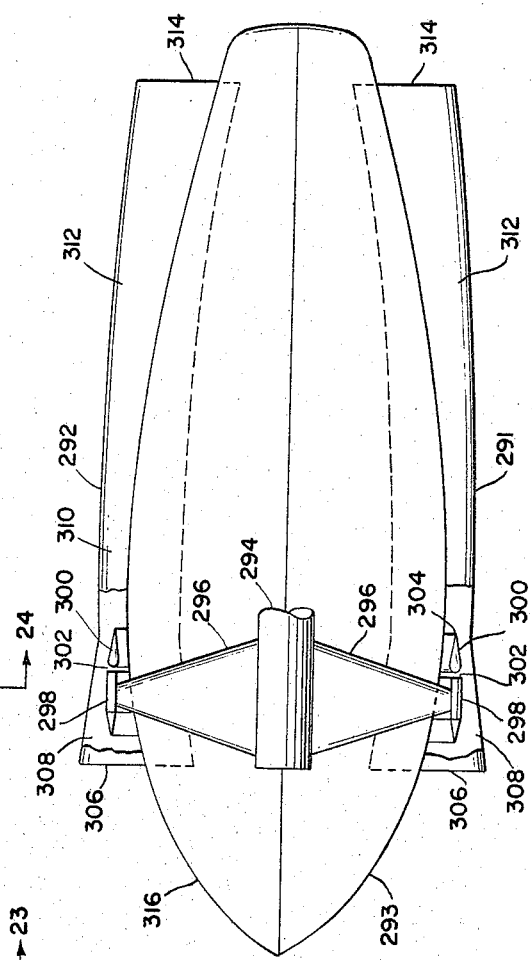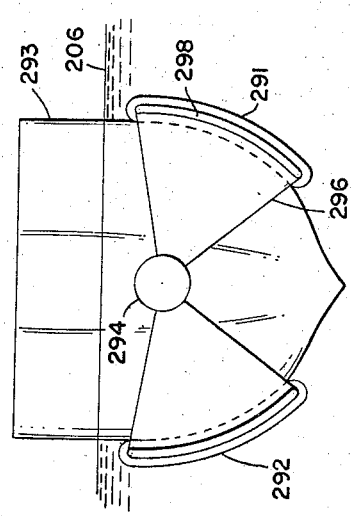

United States Patent Office 3,337,121
Patented Aug. 22, 1967

3,337,121
FLUID PROPULSION SYSTEM
Henri Coanda, Paris, France, assignor to Huyck Corporation, Rensselaer, N.Y., a corporation of New York
Filed July 22, 1964, Ser. No. 384,415
6 Claims. (Cl. 230—95)

The present invention relates to a method and apparatus for effecting fluid propulsion and more particularly relates to a method and apparatus utilizing the physical phenomenon known as the Coanda effect to produce a propulsive force. The propulsive force may be utilized to move fluid through fixed apparatus and thus produce a pumping action, etc., or it may be utilized to move apparatus through a relatively fixed fluid and thus serve to drive a boat, etc.

As employed herein, the term "fluid," unless otherwise explicitly indicated, is intended to encompass matter which exhibits a fluid or flowable characteristic, including gases and liquids with or without particulate solids in suspension, as well as mixtures thereof.

The method and apparatus of this invention is useful in such widely disparate fields as the propulsion of vehicles, including surface vessels, submarines, torpedoes, aircraft, land vehicles, etc., and in transmitting fluids from one point to another, illustratively, as a stock pump for transporting paper slurry or other particulate matter in a liquid or gaseous medium, in the loading of grain elevators, silos and the like, in snow removal equipment and in spreading and atomization devices.

The Coanda effect is the tendency of a jet of fluid to follow a wall contour when discharged adjacent to a surface, when that surface curves away from the jet discharge axis. As more fully described in U.S. Patent 2,052,869, granted September 1, 1936 to Henri Coanda, the Coanda effect is apparent when a stream of fluid emerges from a container, through a slot or other aperture, if one of the lips forming the walls of the slot is extended and recedes continuously from the direction of the axis of the slot. Under such conditions, the fluid clings to the extended lip and tends to increase in velocity, producing a reduced pressure region and causing an intake of large quantities of the surrounding fluid. While the foregoing principle and others considered hereinafter are recited to provide background as to the nature of certain of the relationships involved in the construction of the instant invention and render understanding thereof more facile, it should be understood that the actual invention here involved provides, ragardless of the apposite explanation of its operation, a propulsive force which can be utilized in the movement of fluid relative to propelling apparatus.

It is an object of this invention to provide a method and apparatus for effecting fluid propulsion by application of the principles of the Coanda effect.

It is another object of this invention to provide a method and apparatus for producing motion of a fluid medium relative to apparatus causing the motion.

It is a particular object of this invention to provide improved apparatus arranged for motion relative to a fluid medium by selectively reducing pressure of the fluid medium adjacent to the apparatus.

It is another particular object of this invention to provide apparatus for propelling a fluid by selectively reducing pressure on the fluid in the desired direction of flow.

In order that the invention may be better illustrated, it will now be described in connection with particular embodiments, reference being made to the accompanying drawings. These embodiments are given solely for the purpose of illustration, and they act in no way to limit the scope of the present invention.

In the drawings:

FIGURE 4 is a longitudinal sectional view of another pumping embodiment of the invention;

FIGURE 5 is a longitudinal sectional view of a further pumping embodiment of the invention;

FIGURE 6 is a longitudinal sectional view, partially in elevation, of still another pumping embodiment of the invention;

FIGURE 7 is a longitudinal sectional view, partly in elevation, of a still further pumping embodiment of the invention;

FIGURE 8 is a cross-sectional view taken generally along line 8—8 of FIGURE 7;

FIGURE 9 is a longitudinal sectional view, partly in elevation, of another embodiment of a pumping device utilizing the principles of the present invention;

Figure 25:
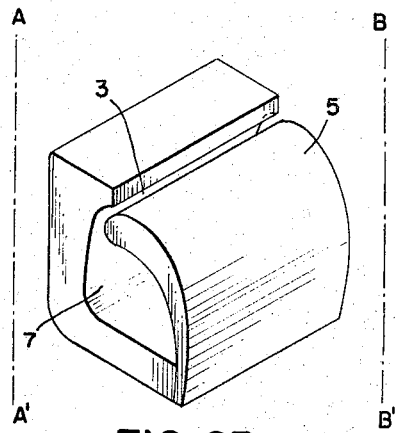

FIGURES 10 and 11 are cross-sectional views taken generally along lines 10—10 and 11—11, respectively, of FIGURE 9;

FIGURE 12 is a schematic representation of a vessel utilizing fluid propulsion apparatus in accordance with an illustrative embodiment of the invention, the apparatus serving as a vehicle propulsion device to propel the vessel;

FIGURE 13 is an enlarged longitudinal sectional view of the propulsion apparatus of FIGURE 12, with certain parts shown in elevation and broken away;

FIGURE 14 is a front elevational view of the device shown in FIGURE 13;

FIGURES 15, 16 and 17 are cross-sectional views taken generally along lines 15—15, 16—16 and 17—17, respectively, of FIGURE 13;

FIGURE 18 is a longitudinal sectional view of another embodiment of a propulsion device utilizing the principles of the present invention, with certain portions shown broken away;

FIGURES 19 and 20 are cross-sectional views taken generally along lines 19—19 and 20—20, respectively, of FIGURE 18;

FIGURE 21 is a partially schematic plan view, partly broken away, of a vessel employing still another embodiment of a propulsion system utilizing the principles of the present invention;

FIGURE 22 is a partially schematic elevational view, partly broken away, of the vessel of FIGURE 21;

FIGURE 23 is a partially schematic bow view of the vessel of FIGURES 21 and 22;

FIGURE 24 is a cross-sectional view taken generally along line 24—24 of FIGURE 22; and FIGURE 25 is a perspective view of a Coanda device illustrating the manner in which it may be made into an internal or an external nozzle.

Figure 1:
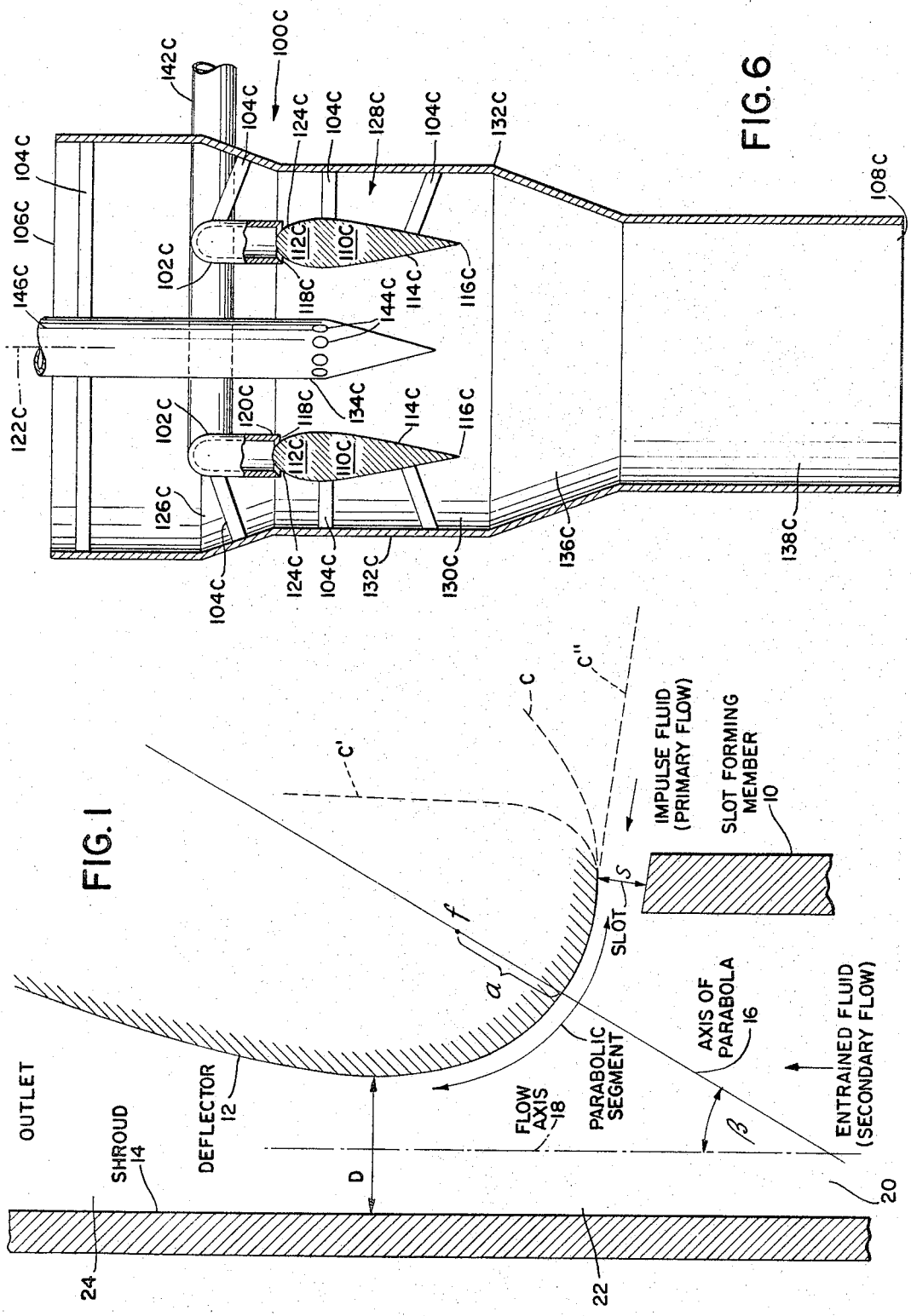
FIGURE 1 is a partially schematic cross-sectional view through a Coanda nozzle which is partly broken away for ease of understanding.

The principles underlying the present invention may be best understood with reference to FIGURE 1. As is shown in this figure, a slot forming member 10 is disposed in spaced relation to a deflector 12 to form a Coanda slot or aperture 13 of predetermined size "S." If desired, the slot forming member may be made adjustable relative to the deflector in order that the size of the slot may be varied. The deflector is spaced apart from a surrounding shroud 14 at a predetermined distance, forming a convergent-divergent nozzle 20. A converging portion 22 is formed on the upstream side of the neck or throat of this nozzle and a diverging portion 24 is formed on the downstream side of the neck. The minimum cross-sectional area of the neck occurs at "D," where the deflector 12 and shroud 14 are closest together.

The term "primary flow" is used herein to describe the flow of relatively high pressure impulse fluid through the Coanda slot and along the surface of the deflector 12. The primary flow passes through the neck and creates an area of subambient pressure at and adjacent to the neck. The subambient pressure induces an influx of the fluid surrounding the inlet of the nozzle. The term "secondary flow" is used herein to describe the flow of entrained ambient fluid into the neck area. The primary and secondary flows blend and are discharged through the outlet.

It has been found advantageous to maintain the shroud substantially cylindrical in configuration with its axis parallel to the direction of induced flow represented by the flow axis 18. However, if desired, the shroud may be varied in shape provided that appropriate and corresponding adjustments are made in the shape of the deflector.

The shape of at least a portion of the surface of the deflector 12 is defined by the segment of a parabola which is revolved about the flow axis 18. The parabola is placed so that its axis 16 intersects the direction of flow, the flow axis 18, at an angle "B," which is called "beta" herein. On the side of the slot farthest from the shroud 14, the deflector may be formed into any desired configuration. As shown in FIGURE 1, the configuration indicated by the dotted line, identified as "C," is a continuation of the parabolic shape. The configuration indicated by the dotted line identified as "C'" has been found to be preferable in a propulsion system for moving objects through a fluid medium, as will be further described below. The configuration defined by the dotted lines identified as "C''" has been found to be especially advantageous for a Coanda nozzle used in conjunction with a fluid pumping apparatus, as will be described below.

The focus of the parabola is located at point "$f$." The distance along the parabolic axis 16 between the focus and the surface of the deflector is "$a$." Distance "$a$" and angle "B" control the geometry of the curved surface of the deflector; "D" has no effect on that surface. Angle "B" varies between zero and 45 degrees, the angle being selected according to the application to be made of the apparatus. Where high momentum is desired, a large beta angle is used, such as in certain pump embodiments. To attain high static force characteristics, as in cases in which the apparatus is to be used for propelling a ship, a relatively small beta angle is employed. The $D/a$ ratio varies between 2.5 and 40. However, while 2.5 is a lower limit, there is no theoretical upper limit provided enough energy is available in the driving or primary fluid. The higher the pressure that is available in the primary fluid, the larger the ratio that may be used. Thus, the upper limit depends on the available driving pressure. Where gases are used for both the primary fluid and the secondary fluid, a higher ratio is used than where either the primary or secondary fluid comprises a liquid. For most applications which have been found to have practical application, the maximum ratio is 40. In some embodiments, the size of the nozzle may be increased in increasing D, keeping the $D/a$ ratio constant. For a given energy input the $D/a$ ratio is constant, that is, where input pressures remain constant the $D/a$ ratio remains constant.

Steam is one illustrative driving fluid for either propulsion of a vehicle through a fluid or for movement of the fluid itself. Steam and other condensable gases have been found to provide a large pressure drop through the apparatus. In the use of a condensable gas as the driving fluid, condensation takes place as the gas emerges from the slot and results in a substantial pressure reduction, thus insuring high flow rates. However, other primary fluids, both gases and liquids, may be used, where desired.

One particular application of the invention involves the propulsion of a fluid in its liquid phase, for example, liquid oxygen. The liquid present within and exterior to the inlet end of a convergent-divergent nozzle is entrained in and propelled by an additional but like fluid in its liquid phase emerging from a Coanda slot disposed within the convergent-divergent nozzle. The emergent liquid enters the Coanda slot in the gaseous state but is expelled into the convergent-divergent nozzle in the liquid state, due to the significant temperature drop effected by the variation in pressure in the course of transmission of the fluid through the Coanda slot.

Apparatus for pumping fluids according to some embodiments of this invention make use of either external or internal Coanda nozzles. These two types of nozzles may be distinguished by referring to FIGURE 25 in which is illustrated a Coanda device having a Coanda slot 3, a parabolically shaped surface 5, and a primary flow conduit 7. If the device were curved into itself about the axis A–A' which appears in FIGURE 25 at the left of the Coanda device, it would form an external nozzle. If on the other hand the device were curved into itself about the axis B–B' which appears in FIGURE 25 at the right of the Coanda device, it would form an internal nozzle. External Coanda nozzles are substantially surrounded by the combined fluid passing through the convergent-divergent nozzle, while Coanda nozzles of the internal type are substantially surrounded by the primary fluid with the combined fluid moving axially through the convergent-divergent nozzle. According to one illustrative embodiment, the pumping system of the present invention involves a Coanda nozzle made up of a parabolic deflector and a Coanda slot formed by a member disposed in spaced relation to the parabolic deflector. Pressurized fluid emitted through the slot entrains ambient fluid within the convergent-divergent nozzle, formed by the shroud surrounding the deflector, into a sustained movement along the course of the convergent-divergent nozzle. The movement effects the transfer of the surrounding fluid to a desired location through a system of conduits, etc.

Figure 2:
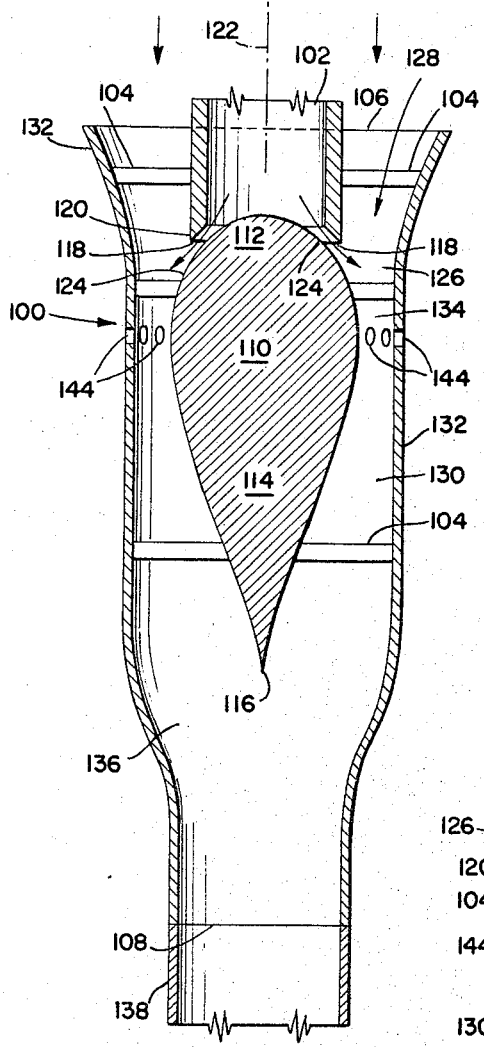
FIGURE 2 is a longitudinal sectional view of fluid propulsion apparatus in accordance with an illustrative embodiment of this invention which is particularly useful as a pumping device.
Figure 3:
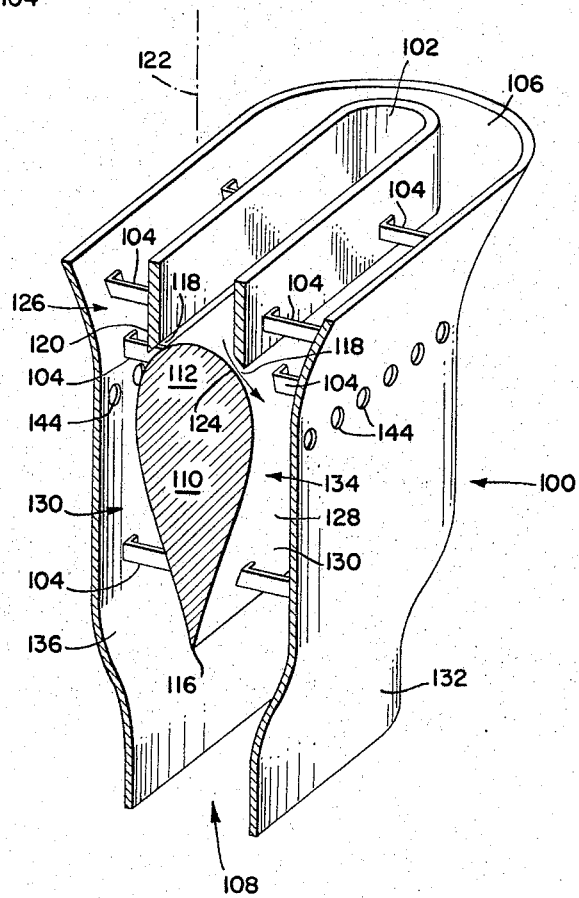
FIGURE 3 is a sectional perspective view of the device illustrated in FIGURE 2.

In FIGURES 2–8, like numbers in the written description and drawings designate like parts, and alphabetical suffixes are used with numbers to designate different parts which serve similar functions. Referring to FIGURES 2 and 3, there is shown a fluid pumping apparatus 100 which communicates with a fluid medium with the longitudinal axis 122 of the apparatus substantially parallel to the direction of movement of the fluid medium. A conduit 102 connected to a supply of primary fluid under pressure (not shown) is coaxially disposed in spaced relation to a shroud 132 by means of the support members 104. The apparatus 100 is arranged to take in the secondary fluid from the environment existing at its forward end 106 and to discharge the combined fluids from the rearwardly disposed outlet end 108.

The pumping system 100 includes a deflector 110 having a curved forwardly disposed end 112 in spaced relation with the terminal edge 120 of the conduit 102, thus defining a Coanda slot 118. The deflector 110 is supported within the shroud 132 in spaced relation to the shroud and conduit 102 by means of support elements 104 which extend inwardly from the inner surface of the shroud 132. The deflector 110 is adapted for partial introduction into the outlet end of the conduit 102 with which it defines a coaxial relation. Any plane through the deflector in the direction of flow is parabolic, at least adjacent the slot 118. Thus, the profile of the deflector at its forward end 112 is such that it recedes laterally and rearwardly in a substantially smooth and continuous manner away from the axis of fluid flow within the jet conduit 102. The rearward end 114 of the deflector, that is, the end remote from the conduit 102, is tapered to form a trailing edge 116. The deflector seen in longitudinal section presents approximately a tear drop configuration. The conformation of the conduit 102 in the embodiment of FIGURES 2 and 3 is generally rectangular. However, this configuration is not critical and can, for example, be circular, oval or annular.

The parabolic segment 124 is formed by the surface of the deflector 110. From the blunt forward end 112 of the deflector, the deflector's cross-sectional area in successive planes perpendicular to the axis of flow 122 increases to a maximum, thus with the shroud 132 defining the convergent portion 126 of a convergent-divergent nozzle 128, and then diminishes to a trailing edge 116, to define with the shroud the divergent portion 130 of the nozzle 128. The variations in cross-sectional area of the convergent-divergent nozzle 128 are thus defined by the internal cross-sectional area of the shroud 132 in conjunction with the external cross-sectional area of the deflector 110. Frequently, as seen, illustratively, in FIGURES 2 and 3 of the drawings, the variable definition of the convergent portion 126, of the neck 134 and the divergent portion 130 are caused solely by the variation in cross-sectional area of the deflector 110, the shroud 132 remaining substantially unmodified and parallel to the longitudinal axis of the apparatus 100 throughout the length of the convergent-divergent nozzle 128.

The pressurized primary fluid is propelled through the slot 118, undergoing a pressure reduction and correlative temperature drop in its passage. In accordance with the Coanda effect, the emergent flow from the slot 118 pursues closely the curvature of the parabolic segment 124. A zone of sub-ambient pressure is created at the slot outlet. The fluid of the environment, being at ambient pressure, flows through inlet 106 toward the region of sub-ambient pressure. The incoming ambient fluid combines with the fluid from slot 118, passes between the deflector 110 and shroud 132 and enters the diverging portion 130.

The rearward end of the shroud 132 is in longitudinal alignment with the edge 116 of the deflector 110. The diverging nozzle portion 130 discharges into an outlet duct 136 which extends rearwardly from the shroud 132. The outlet duct 136 opens into a second outlet duct 138 of reduced diameter which communicates with a suitable outfeed conduit (not shown).

By adjusting the angle Beta and the ratio $D/a$ within the ranges discussed heretofore, the pumping apparatus is effective to provide optimum flow rates, optimum momentum augmentation, maximum efficiency, etc., consistent with the particular application for which the apparatus is intended.

The cross-sectional area of the convergent-divergent nozzle also may be defined in the manner shown in each of the embodiments of FIGURES 4 to 8. FIGURE 4 is illustrative of a Coanda nozzle having an annular configuration. The convergent segment 126A of the convergent-divergent nozzle 128A is formed initially by the shroud 132A, the outer surface of the conduit 102A, the parabolic segment 124A and the tapered portion 114A of the deflector 110A. To continue the convergency of the segment, the shroud 132A contracts to a neck 134A immediately behind the terminal edge 116A. The divergent portion 130A is in turn provided by the divergent flaring of the shroud 132A.

The pressurized primary fluid passing through the conduit 102A and the Coanda slot 118A entrains substantial quantities of the secondary fluid from the inlet 106A and accelerates the movement of the fluid toward the outlet 108A. Particularly during the initial portion of the pumping operation, the acceleration of the fluid is further enhanced through the use of an axial passage 111 in the deflector 110A. The passage 111 is tapered adjacent the deflector end 116A and permits a small quantity of the primary fluid to flow directly from the conduit 102A to the throat of the convergent-divergent nozzle 128A.

As shown in FIGURES 5 and 6, a plurality of pressurized primary fluid conduits 102B and 102C and deflectors 110B and 110C mounted in spaced relation to each other may be disposed in a single convergent-divergent nozzle.

As shown in FIGURE 6, the dual jet or compressed fluid feed conduits 102C emerge from a single header conduit 142C which enters the convergent-divergent nozzle 128C through the shroud wall 132C at an angle substantially perpendicular to the flow axis 122C of the apparatus 100C. The terminal portions of the jet conduits 102C and the deflectors 110C are, however, disposed parallel to this axis.

The shroud arrangement of the illustrative embodiments of the invention appearing in FIGURES 5 and 7 are similar to that appearing in FIGURE 4. In FIGURE 5, however, dual compressed fluid conduits 102B and deflectors 110B are disposed along axes parallel to the adjacent converging wall of the shroud 132B, and the diverging portion 130B terminates in the outlet duct 136B.

The conformation of the shroud 132C as shown in FIGURE 6 is similar to that of shroud 132 illustrated in FIGURE 2, except that dual deflectors 110C and conduits 102C are mounted within the shroud 132C as in the embodiment of FIGURE 5. The fluid emitted from the Coanda slot 118C passes into the convergent portion 126C of the convergent-divergent nozzle 128C, entraining ambient fluid received from the environment at the anterior end 106C of the apparatus 100C. The fluid at the anterior end 106C may be part of the environment surrounding the device 100C or may be a fluid delivered by a fluid feed duct, not shown, the outer margins of which form a continuous passage with the shroud 132C. The combined fluids are increased in velocity and reduced in pressure as they pass through the converging segment 126C, attaining their maximum velocity and lowest pressure in the constricted neck 134C of the convergent-divergent nozzle. In passing from the neck 134C into and through the diverging portion 130C, the velocity of the fluid is reduced and the pressure thereof increased. The combined stream then passes from the diverging portion 130C through its outlet duct 136C into and through the second outlet duct 138C.

Near the posterior termination of the converging portion 126C, in the neck 134C itself, or preferably immediately posterior to the neck at the point of initial divergence in the nozzle 128C, there are disposed in certain preferred embodiments a vent or vents 144C which appear as a plurality of orifices in the drawings. The vents establish communication between the convergent-divergent nozzle 128C and the environment surrounding the apparatus 100C.

In a preferred embodiment, for example, the vents 144, 144A, 144B are disposed in annular fashion about the shroud 132, 132A, 132B as seen in FIGURES 2 to 5. On the other hand, as shown in FIGURES 6 and 7, a central tube conduit 146C, 146D containing the vents 144C, 144D may be disposed along the central axis of the apparatus 100C, 100D intermediate between the dual jet conduits 102C, 102D and deflectors 110C, 110D. The central conduit 146C, 146D communicates with the ambient environment surrounding the device 100C, 100D in any convenient manner adapted to the use envisioned, for example, through the anterior end 106C supported by members 105C, as shown in FIGURE 6.

In FIGURES 7 and 8 it will be seen that the central conduit 146D provides vents 144D between the ambient environment and the divergent portion 130D. In this embodiment, however, the conduit 146D extends through the central axis of the deflector 110D. The central axis of the deflector 110D coincides with the flow axis 122D of the apparatus 100D. The termination of the central conduit 146D and the terminal edge 116D coincide. The vents 144D are disposed adjacent and anterior to terminal edge 116D about the circumference of the central conduit 146D. In FIGURES 6 and 7, the vents 144C, 144D appear in the preferred position immediately posterior to the neck 134C, 134D at the point of initial divergence in the nozzle 128C, 128D.

For reasons of simplicity and economy of construction vents 144 established in the shroud 132 are normally preferred where a single jet conduit 102 and deflector 110 are present within the shroud 132. The vents 144 provide a supplementary fluid mass from the ambient environment which is entrained into the primary stream emanating from the neck 134 to cause an even higher momentum in the fluid mass present in and passing through the diverging portion 130 of the convergent-divergent nozzle 128, where the velocity of the fluid mass is materially decreased. The additional entrainment of ambient fluid through the vents 144 provides high momentum and simultaneously a rapid movement through the apparatus 100. The effectiveness of the vents 144 is particularly evident where fluids which are substantially non-compressible are transmitted through the device 100. Illustrative of such non-compressible fluids are liquids, and particularly liquid oxygen.

While the inlet end 106 and outlet duct 136 may have substantially the same cross-sectional area, the cross-sectional area of the second outlet duct 138 is capable of substantial variation in order to provide an increase or decrease in pressure and velocity in the fluid flow. As seen in FIGURE 2, for example, the cross-sectional area of the second outlet duct 138 is less than that of the outlet duct 136 due to the reduction in size of the wall of the shroud 132. Consequently, the combined stream from the second outlet duct 138 is discharged at a velocity and momentum in excess of that at which the stream is passed from the outlet duct 136. If desired, however, the second outlet duct 138 may be increased in cross-sectional area as, for example, by an outward flaring of the terminal end of the shroud 132 as shown in FIGURES 4 and 7. This latter modification further reduces the velocity of fluid flow.

It is observed too that in the convergent-divergent nozzle the same amount of fluid passes through the constricted neck in a prescribed period as passes through the enlarged cross-sectional areas of the divergent or convergent segments. The mass of the fluid passing any point in the convergent-divergent nozzle during a given period of time is a function of the cross-sectional area of the nozzle and the density and the velocity of the fluid stream, etc. At the constricted neck of a convergent-divergent nozzle of given size, in order for the fluid mass passing therethrough to be a constant, the product of the density and the velocity of the stream must be greater than the product of the density and velocity of this same stream, for example, at the anterior end of the converging segment or the outlet duct. Accordingly, where the density of the fluid remains substantially constant or is not sufficiently increased to alone compensate for the decreased cross-sectional area of the nozzle neck, the velocity of the fluid will necessarily increase at the neck as well as in the converging portion, while decreasing correspondingly in the diverging portion. This latter premise will, of course, be applicable where a substantially non-compressible liquid, and hence a liquid of substantially constant density, e.g., liquid oxygen, is employed.

However, the actual phenomenon is believed to be much more complex and is related rather to the potential energy of the fluid as represented by the internal stresses manifested. With particular reference to the fluid system of the drawings, it has been found, for example, that the velocity of flow ($v$) which corresponds for a given mass to a given kinetic energy is a proportional function of the square root of the difference in pressures (which may be designated by the symbol $\Delta P$) prevailing in the fluid at the inlet and outlet of the convergent-divergent nozzle and is inversely proportional to the square root of the density ($d$) of the same fluid. The relationship may be expressed as follows:

$$v = f\sqrt{\Delta P/d}$$

Where, as in one of the preferred embodiments of the invention, liquid oxygen is being propelled in application of this formula, it will be seen that because the density may be considered as remaining constant, the pressure differential between the fluid flow, as it is emitted from the convergent-divergent nozzle at the outlet duct, and as it is introduced at the anterior end, must be increased. To accomplish this the pressure of the fluid at the outlet duct is increased, the pressure of the fluid entering the convergent-divergent nozzle remaining constant. This increase in fluid pressure is accomplished most effectively by the provision of the vents immediately posterior to the neck of the convergent-divergent nozzle as described.

The higher pressure imposed on the fluid at the outlet exists as a function of the energy expended to effect the increase in pressure of the fluid as it emerges from the neck of the nozzle. This is consistent with the established principle that a fluid stream will normally and otherwise have the same kinetic energy at the inlet and outlet of a convergent-divergent nozzle, the cross-sectional areas of which are the same.

Another embodiment of a fluid pumping apparatus is shown in FIGURES 9–11. In this embodiment the shroud is comprised of two parts 132E and 132E' which are threadably connected to each other, an O-ring 133E maintaining a pressure tight seal between them. The fluid feed conduit 102E is coaxially disposed with the shroud and is connected to it by retaining rings 103E. The deflector 110E has an extended support rod 109E at its anterior portion. The rod 109E is threadably connected into a tapped hole 111E located in the fluid feed conduit 102E. The main channel of the fluid feed conduit divides into smaller channels 102E communicating with a chamber 107E defined by a terminal segment 102E' of fluid feed conduit 102E. The terminal edge 120E of terminal segment 102E' is spaced apart from parabolic segment 124E of deflector 110 to form Coanda slot 118E.

The ambient fluid enters through holes 105E in the side of shroud member 132E and passes into a converging portion 126E of a convergent-divergent nozzle 128E, being entrained by the flow of pressurized fluid through the Coanda slot 118E which creates a reduced pressure at the neck 134E. The ambient fluid then passes through the diverging portion 130E of the nozzle 128E and leaves the shroud through the outlet 108E.

An additional stream of pressurized fluid is introduced through a conduit 150E and enters a chamber 152E in shroud segment 132E'. The chamber 152E is substantially annular in configuration and is coaxial with the shroud member 132E'. The chamber 152E communicates with the diverging portion 130E of the nozzle 128E through apertures 144E and serves, as described above, to increase the pressure in the diverging segment, thus adding an increased propulsive force to the fluid being pumped.

A propulsion system for vehicles may be constructed in accordance with the principles of this invention. In accordance with one illustrative embodiment of the invention, as applied to boats, etc., a fluid is introduced under pressure into and through an internal Coanda slot and is directed past the extended lip of the nozzle into the convergent segment of a convergent-divergent nozzle, passing sequentially into the constricted neck and then through the divergent portion of the nozzle. As the fluid passes through the Coanda slot and enters the convergent-divergent nozzle, a region of reduced pressure, pressure lower than the ambient pressure, is created into which ambient fluid from selected surrounding regions is induced.

The movement of the ambient fluid causes a conversion of static head to velocity head and results in the reduction of pressure in those selected regions from which the ambient fluid is drawn. By selecting regions external to one side of the apparatus for withdrawal of ambient fluid, a motion of the apparatus toward those regions is accomplished by creating a pressure differential on opposed external surfaces of the vehicle. The amount of propelling force thus created is proportional to the differential pressure multiplied by the surface area over which the pressure differential exists.

The Coanda nozzles used for propulsion of vehicles may be formed in embodiments which are entirely separate from the vehicle except for connections thereto. Such apparatus may be connected to the hull of a ship, for instance, as is shown in FIGURES 12–20, and may be used for propelling the ship. Other embodiments of the nozzle used for ship propulsion may be conformed to the shape of the hull of the ship and may be disposed within the thickness of the hull of the vessel, such as is shown in FIGURES 21–24. The ambient fluid passes from the restricted throat region of a convergent-divergent nozzle into a region of increased volume. The velocity head is converted into static head, and by a jetting action, adds to and reinforces the propulsive force.

Referring more particularly to FIGURES 12–17, there is shown one or more fluid propulsion devices 200 suspended from the hull of a ship 202 by means of a pressurized fluid conduit 204 bearing stabilizing fin 201 as well as a support beam 203 having a stabilizing fin 205.

The device 200 is disposed in a fluid medium 206, such as sea water or the like, with its longitudinal axis parallel to the direction of travel. The device 200 is arranged to take in ambient fluid from the surrounding environment at an anterior inlet 208 and to discharge fluid from a posterior outlet 210 to propel the vessel or vehicle to which the device 200 is attached.

The pressurized fluid conduit 204 connects to the fluid feed conduit 212 disposed in the rearwardly tapered deflector 214. The pressurized fluid introduced into the conduit may be either gaseous or liquid and may be identical to the ambient fluid. The fluid is introduced into the pressurized fluid conduit 204 and feed conduit 212 system under pressure by any suitable means, not shown. Where a liquid such as water is employed as the propulsion fluid it may be introduced into the pressurized fluid conduit 204 in the vapor phase and may or may not assume its liquid phase upon entry into the fluid feed conduit 212.

The particular pressurized fluid supply employed in the practice of the invention is subject to substantial variation. The pressurized fluid conduit 204, which serves with the support elements 216 to retain the posterior tapered end of the deflector 214 in position, may be arranged to connect with the deflector 214 at a point forward of the position shown in FIGURE 13 of the drawings. Alternatively too, the compressed fluid feed may be generated by a suitable supply means positioned in the interior of the deflector 214 or elsewhere within the device 200 and connected to an elongated or abbreviated fluid feed conduit. The compressed fluid, however derived, passes forwardly through the fluid feed conduit 212 to a cylindrical chamber 218 positioned at the head of the conduit 212. The chamber 218 is bounded on its lateral margins by the inner annular side wall 220 which is recessed from, but parallel to, the side wall 222 of the fluid feed conduit 212. Side wall 220 is rounded at the end thereof remote from the conduit 212 to present a smooth curvature. The adjacent annular wall 224 forms a smooth continuation of the wall 220 and defines a parabolic segment of rotation, as described with regard to FIGURE 1, which extends in a rearward direction. The parabolic wall 224 forms one side of an annular Coanda slot 226 and diverges in each radial plane outwardly from the axis of the annular slot. The wall 224 provides the forward outer surface of the deflector 214.

The opposite side of slot 226 is provided by the peripheral margin 228 of the circular shield 230. This shield is disposed at substantially right angles to the axis of the fluid feed conduit 212 and is mounted across the forward end of the cylindrical chamber 218. The shield 230 is substantially in the form of a small segment of a sphere and is coaxial with the deflector 214. The surface of the shield opposite that adjacent the chamber 218 is of curved configuration and recedes progressively toward the Coanda slot 226. The shield is supported by one end of an arm 232 which extends through the chamber 218 in a direction parallel to the flow axis 234. The arm 232 is attached at its opposite end to the adjacent face 236 of the deflector 214. Support arm 232 serves to facilitate maintaining the forward portion of the deflector 214 in spaced relation to the cylindrical shroud 238 through its attachment to the shield 230. Attached in turn to the outer and forwardly extended axial hub 240 of the shield 230 are a plurality of radiating arms 242 which support the forward end of a cylindrical conduit 244.

As best shown in FIGURE 15, the conduit 244 is provided with a plurality of vents 246 intermediate its ends which are disposed at intervals around the plate periphery. The conduit 244 defines the forward portion of the shroud 238. Conduit 244 is attached at its posterior end to the anterior margin of a cylindrical jacket 248 which defines the middle portion of the shroud 238. Jacket 248 surrounds the posteriorly tapered deflector 214 and extends to annular member 250 which is also part of shroud 238. The fluid conduit 204 extends through the side wall of the annular member 250 and is affixed thereto to aid in spacing the shroud and the deflector. The member 250 communicates at its posterior end to a tapered discharge duct 252 which is connected sequentially to an outlet conduit 254 of reduced diameter. The shroud 238 is made up of cylindrical conduit 244, jacket 248, annular member 250, discharge duct 252, and outlet duct 254.

The shield 230, deflector 214 and shroud 238 define an annular convergent-divergent nozzle 256. The inner wall of the convergent-divergent nozzle 256 is formed by the anterior outer surface of the shield 230, the rounded parabolic wall 224 and the tapered outer surface of the deflector 214. The outer wall of nozzle 256 is formed by the inner surface of the shroud 238. The smallest clearance between shroud 238 and deflector 214, and therefore the least cross-sectional area, occurs at neck 258.

The fluid emanating from the Coanda slot 226 pursues closely the curvature of the extended annular wall 224 which recedes continuously from the slot axis. A zone of subambient pressure is thus created at neck 258 by the fluid flowing from the Coanda slot 226. Entrained into this flow is a comparatively large volume of the surrounding fluid in which the device 200 is suspended. The fluid is drawn or enters through the anterior inlet 208. The direction of fluid flow through nozzle 256 is substantially opposite to the direction of fluid flow through the feed conduit 212. The combined fluids pass sequentially into the constricted neck 258 of nozzle 256 where the least pressure and greatest velocity is attained. The ambient flow entering the nozzle 256 is increased as the propulsive apparatus 200 of the invention moves forward in the surrounding medium.

In a preferred embodiment, immediately posterior to the neck 258 at the point of initial divergence in the nozzle 256, vents 246 are disposed in annular fashion between the ends of the conduit 244. The vents 246 permit entry of a supplementary fluid mass which is entrained into the fluid flow emanating from the neck 258, thus serving to effect an even higher pressure in the fluid mass present in and passing through the divergent portion 262 of the nozzle 256 where the velocity of the fluid mass is materially decreased.

The influx of additional ambient fluid immediately posterior to the neck 258 is small where a compressible fluid such as gas or vapor is being moved through the device 200, and in some cases the vents 246 may be omitted. Where liquids are utilized and only low speeds required for the vehicle being moved by operation of the device, the vents may also be omitted. The additional entrainment of ambient fluid is of particular utility where high vehicular speeds are desired and a liquid is used as the propulsive fluid, due to substantial non-compressibility.

This additional fluid entrainment represents a significant improvement in construction even where gaseous fluids are employed, however.

The annular cross-sections of the divergent portion 262 of nozzle 256 increase in area in the direction of flow toward the outlet 210. The cross-sectional area of any plane through divergent portion 262 is the difference between the cross-sectional area of the substantially circular shroud 238 and the cross-sectional area of the posteriorly receding deflector 214. The posteriorly receding deflector 214 defines a cone. In several advantageous embodiments, this cone has an apex angle within the range of 4° to 6.5° inclusive to provide optimum propulsive force, although in other cases the cone angle is somewhat outside this range.

Upon emerging from the divergent portion 262 of the convergent-divergent nozzle 256, the fluid mass enters the discharge duct 252. The outlet orifice 264 of nozzle 256 is coincident with the posterior termination of the deflector 214. That is, the outlet orifice 264 is disposed at the same axial position as the tapered termination of the deflector 214. The cross-sectional area of the inlet 208 and that of the outlet orifice 262 are substantially the same.

In the embodiment of FIGURES 13–17, the cross-sectional area of the discharge duct 252 is adapted to approximate that existing in the outlet orifice 264 at the adjacent terminal end of nozzle 256, but becomes progressively smaller at the central section of the duct 252. With this arrangement, the outlet conduit 254 of duct 252 is reduced in size with respect to the outlet orifice 264, and the fluid emanating from the outlet conduit 254 is at a relatively high pressure and velocity. In other good embodiments, however, particularly in cases in which lower discharge velocities are desired, the diameter of the outlet conduit 254 may be somewhat larger, thus providing a lower exit velocity for the fluid. In some cases the diameter of the outlet conduit 254 is substantially equal to that of the outlet orifice 264, with the result that the fluid mass passing from the outlet conduit 254 does so at a velocity and pressure equivalent to that with which the fluid is passed from the outlet orifice 264. If desired, the discharge duct 252 may be further increased in size as, for example, by an outward conical flaring thereof to further reduce the velocity of the flow from the outlet orifice 264.

The pressure differential between the fluid as it is emitted from the convergent divergent nozzle 256 at the outlet 264 and as it is introduced at the inlet 208 determines the outlet velocity. The initial increase in the pressure differential is provided by reducing the pressure of the fluid as it enters the converging portion 260 of the nozzle 256. This is accomplished through the use of the Coanda slot 226, which forms a low pressure zone adjacent the annular wall 224. The arrangement is such that the fluid is discharged from the outlet conduit 254 at a pressure substantially in excess of the pressure of the fluid entering the convergent-divergent nozzle. For fluid under constant pressure entering the nozzle 256, the outlet velocity is increased by increasing the pressure of the fluid at the outlet 264. This increase in fluid pressure is accomplished most effectively by the configuration of the diverging portion 260 of the nozzle 256 and is substantially augmented by the provision of the circumferentially disposed vents 246 immediately posterior to the neck 258 of the nozzle 256. The vents 246 admit ambient fluid provide a substantial pressure increase in the diverging segment of the nozzle as compared with the pressure in the neck.

An illustrative and preferred embodiment of the practice of the present invention involves introducing steam under a pressure of five atmospheres through the pressurized fluid conduit 204 and fluid feed conduit 212, then through the annular Coanda slot 226, at which point the fluid mass attains a speed of about 2100 feet per second, and then asymmetrically about the annular wall 224, in accordance with the Coanda effect, creating along the surface of the wall 224 a vacuum having a fluid pressure less than one atmosphere. Water from the environment surrounding the device 200 is entrained into this zone and into the neck 258. The neck 258 having the least cross-sectional area of any point within the shroud, provides the area of greatest velocity and lowest pressure for the steam and water traversing the nozzle 256, as described hereinabove. The vents 246 serve to provide entry into the nozzle 256 of further water from the existing environment, thus further enhancing the pressure which will mount to within the range of 25 to 50 atmospheres at the decreased velocity of flow occurring in the divergent portion 260 of the venturi-type nozzle. The fluid mass will emerge from the discharge duct 252 and outlet conduit 254 at this reduced velocity and high pressure, thus supplying the driving force for the device 200 and the vehicle to which it is connected.

Another embodiment of the vehicle propulsion system is shown in FIGURES 18–20. In that embodiment the pressurized fluid conduit 204A is disposed in front of the deflector 214A and is entirely external to it. The fluid feed conduit has a feeder segment 265 located at its end. The end portion 265 is cylindrical in shape, one end being closed by streamlined member 266. The deflector 214A is supported in spaced relation to the segment 265 by means of support bracket 267 which is connected by bolt 268 to bracket 269 affixed within member 265. By rotating support bracket 267 the size of slot 226 may be adjusted by changing the distance between terminal edge 270 of member 265 and shoulder member 271 of deflector 214A.

As may be seen in the drawings, the deflector is annular in configuration, as is the Coanda slot 226A. The shoulder portion 271 of the deflector 214A continuously recedes from the axis of the Coanda slot 226A, thus producing the Coanda effect with fluids emerging from feed conduit 204A.

The shroud is made up of members 272, 273, 274, 275, 276 and 277. Shroud inlet member 272 is open at both ends and permits the introduction of ambient fluid through inlet 278. Shroud members 273 and 274 together form the converging segment 279 of a convergent-divergent nozzle 280 of which diverging portion 281 is a part. The diverging segment is formed by shroud members 275 and 276. The shroud outlet member 277 permits the exhaust of pressurized fluid through outlet 282.

A second stage is formed by an external Coanda nozzle, one which substantially surrounds the fluid passing through the convergent-divergent nozzle. A second stage Coanda slot 283 is formed between shroud members 273 and 274 which are maintained in spaced relation to each other, being threadably adjustable. Pressurized fluid is introduced through conduit 284 into chamber 286 from which it passes through slot 283 passing over the surface 288 which continuously recedes from the axis of the Coanda slot 283.

Shroud members 274 and 275 are maintained in spaced relation to each other forming an annular aperture or slot 290. Pressurized fluid is introduced into chamber 285, defined between members 274 and 275, through fluid feed conduit 287. The pressurized fluid passes through the annular slot 290 and serves to increase the pressure in the diverging portion 281 of the nozzle 280, thereby adding increased pressure and increased propulsive force.

An embodiment of the present invention in which the Coanda nozzles are made integral with the hull of a vehicle to be propelled is shown in FIGURES 21–24. In the embodiment of these figures the shrouds 291, 292 are disposed on opposite sides of the hull 293 below the level of the fluid 206, water in the preferred embodiment. A source 294 of high pressure fluid, which may be steam, is disposed within the hull and connected by conduits 296 to pressurized fluid distributors 298 disposed one in each of shrouds 291, 292. The distributors are of elongated, arcuate configuration as shown in the drawings, and are placed in spaced relation with deflectors 300 thus defining Coanda slots 302. High pressure fluid passing through the Coanda slot creates an area of reduced pressure at a neck 304 and entrains the ambient fluid 206, which passes through an inlet 306 into a converging segment 308 of a convergent-divergent nozzle 310. The ambient fluid mixes with the fluid from the Coanda slot and passes through a diverging segment 312 of the nozzle 310 leaving the vehicle through an outlet 314. The propulsive force is due to the pressure of the fluid discharging through the outlets 314, and is also due to the reduced pressure created in front of bow section 316 of the boat 202 by the entrainment of fluid adjacent the bow section. The entrainment of the fluid causes a motion of the fluid towards the nozzle inlet 306 and causes a conversion of the static pressure into velocity pressure with a resultant reduction in the resistance to flow of the vehicle into that portion of the water. The vehicle moves toward the area of low pressure adjacent the bow 316 being urged by the high pressure adjacent the stern 318.

The pressure in the diverging segment 312 may be increased permitting ambient fluid 206 to enter the diverging segment through orifices 320 placed downstream of the neck 304 near the beginning of the diverging segment 312, as shown in the drawings.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. For instance, the present invention may be applied to the propulsion of vehicles such as automobiles, airplanes and the like, using air, for example, as the propelling fluid.

What is claimed is:

1. Pumping apparatus for producing a fluid propulsion force in a fluid medium, which comprises an annular shroud, a plurality of pressurized fluid feed conduits positioned with their outlet ends in radially spaced relationship with each other within said shroud, and a plurality of elongated fluid deflectors extending longitudinally in radially spaced relationship with each other within said shroud, the outlet end of each of said conduits being disposed coaxially about a given end of a corresponding one of said deflectors in spaced relation thereto and in spaced relation to said shroud, each of said deflectors having a predetermined parabolic surface immediately adjacent the given end thereof which diverges continuously in each radial plane from the axis of said corresponding conduit and the deflector therefor, the termination of each of said conduits and the diverging parabolic surface in proximity thereto defining an annular aperture to provide an annular Coanda nozzle, the diverging parabolic surface of each of said deflectors providing an extended lip for the associated aperture, said deflectors and said shroud forming a convergent-divergent nozzle having a converging segment and a diverging segment, said converging segment being positioned to receive fluid emitted from said apertures and also to receive ambient fluid from said fluid medium, said diverging segment being positioned to discharge the combined fluid under pressure to provide a fluid propulsion force.

2. Apparatus for producing a fluid propulsion force, which comprises an elongated shroud having an axis, a plurality of pressurized fluid feed conduits positioned with their outlet ends in spaced relationship with each other within said shroud, each of said conduits having an axis and at least one of said conduit axes being spaced from the axis of said shroud, and a plurality of fluid deflectors extending in spaced relationship with each other within said shroud, each of said deflectors being spaced from said shroud, the outlet end of each of said conduits being disposed in predetermined spaced-apart relationship with a corresponding one of said deflectors, each of said deflectors having a parabolic surface in close proximity with the outlet end of the corresponding conduit, the outlet end of each of said conduits and the parabolic surface in proximity thereto defining an aperture to provide a Coanda nozzle, the parabolic surface of each of said deflectors providing an extended lip for the associated aperture, said deflectors and said shroud forming a convergent-divergent nozzle having a converging segment and a diverging segment, said converging segment being positioned to receive fluid emitted from said apertures and also to receive ambient fluid from said fluid medium, said diverging segment being positioned to discharge the combined fluid under pressure.

3. Apparatus for producing relative motion between a fluid medium and apparatus disposed within said fluid medium, which comprises an elongated shroud having an axis, a plurality of pressurized fluid feed conduits positioned with their outlet ends within said shroud, said outlet ends being spaced apart in a direction transverse to the axis of said shroud, and a plurality of elongated fluid deflectors extending longitudinally within said shroud, the outlet end of each of said conduits being disposed coaxially about a given end of a corresponding one of said deflectors in spaced relation thereto, each of said deflectors having a predetermined parabolic surface immediately adjacent its given end which diverges continuously in each radial plane from the axis of the deflector, the outlet end of each of said conduits and the diverging parabolic surface in proximity thereto defining an aperture to provide a Coanda nozzle, the diverging parabolic surface of each of said deflectors providing an extended lip for the associated aperture, said deflectors and said shroud forming a convergent-divergent nozzle having a converging segment and a diverging segment, said converging segment being positioned to receive fluid emitted from said apertures and also to receive ambient fluid from said fluid medium, said diverging segment being positioned to discharge the combined fluid under pressure.

4. Apparatus for producing relative motion between a fluid medium and apparatus disposed within said fluid medium, which comprises a pressurized fluid conduit, a deflector defining an aperture in the form of a Coanda slot with said fluid conduit, said deflector having an axis and having a predetermined parabolic surface that recedes continuously from the discharge axis of said aperture, and a shroud disposed in spaced relation around said deflector and said fluid conduit, said shroud defining a convergent-divergent nozzle with said deflector, the converging segment of said convergent-divergent nozzle being positioned to receive ambient fluid from said fluid medium and also pressurized fluid from said aperture, said deflector including a passage extending along the axis of said deflector substantially directly from said fluid conduit to the throat of said convergent-divergent nozzle to introduce pressurized fluid from said conduit to said throat, the pressurized fluid from said passage combining with the pressurized fluid from said aperture and with said ambient fluid at said throat, the diverging segment of said convergent-divergent nozzle being positioned to discharge the combined fluid under pressure.

5. Apparatus as defined in claim 4, in which said shroud includes a plurality of orifices therein at the point of initial divergence of said convergent-divergent nozzle.

6. Apparatus as defined in claim 4, in which the axis of the parabola defining said surface forms an angle of between about zero and forty-five degrees with the axis of said deflector, and the distance between said deflector and said shroud at the throat of said convergent-divergent nozzle is about 2.5 to 40 times as large as the distance between the focus of said parabola and the point on the parabolic axis where it intersects said surface.

(References on following page)

References Cited

UNITED STATES PATENTS

| | | | |
|---|---|---|---|
| 519,728 | 5/1894 | McGowan | 103—260 |
| 1,215,321 | 2/1917 | Leblanc | 230—104 |
| 2,000,762 | 5/1935 | Kraft | 230—95 |
| 2,130,300 | 9/1938 | Evans | 103—264 |
| 2,134,460 | 10/1938 | Honert | 230—95 |
| 2,524,559 | 10/1950 | Campbell et al. | 230—95 |
| 2,892,582 | 6/1959 | O'Rourke | 230—95 |
| 2,920,448 | 1/1960 | Coanda | 60—39.49 |
| 3,047,208 | 7/1962 | Coanda | 230—95 |

FOREIGN PATENTS

| | | |
|---|---|---|
| 186,198 | 2/1955 | Austria. |
| 860,896 | 10/1940 | France. |
| 236,042 | 6/1911 | Germany. |
| 244,002 | 2/1912 | Germany. |
| 293,380 | 8/1916 | Germany. |
| 643,387 | 9/1950 | Great Britain. |

MARK NEWMAN, *Primary Examiner.*

D. HART, *Assistant Examiner.*